United States Patent [19]

Sakamoto et al.

[11] Patent Number: 5,410,200

[45] Date of Patent: Apr. 25, 1995

[54] HYBRID TYPE STEPPING MOTOR

[75] Inventors: Masafumi Sakamoto, Kiryu; Akira Tozune, Hitachi, both of Japan

[73] Assignee: Japan Servo Co., Ltd., Tokyo, Japan

[21] Appl. No.: 113,305

[22] Filed: Aug. 30, 1993

[30] Foreign Application Priority Data

Aug. 31, 1992 [JP] Japan ................... 4-253622

[51] Int. Cl.⁶ .......................................... H02K 37/14
[52] U.S. Cl. ..................................... 310/49 R; 310/51
[58] Field of Search ........................... 310/49 R, 51

[56] References Cited

U.S. PATENT DOCUMENTS

| | | | |
|---|---|---|---|
| 4,206,374 | 6/1980 | Goddijn | 310/49 R |
| 4,347,457 | 12/1980 | Sakamoto | 310/256 |
| 4,384,226 | 5/1983 | Sato et al. | 310/89 |
| 4,449,391 | 5/1984 | Anthony | 73/32 R |
| 4,503,368 | 3/1985 | Sakamoto | 310/49 R |
| 4,672,253 | 6/1987 | Tajima et al. | 310/269 |
| 4,675,564 | 6/1987 | Isozaki | 310/49 R |
| 4,764,697 | 8/1988 | Christiaens | 310/49 R |
| 4,983,867 | 1/1991 | Sakamoto | 310/49 R |
| 5,032,747 | 7/1991 | Sakamoto | 310/49 R |
| 5,128,570 | 7/1992 | Isozaki | 310/49 R |
| 5,243,246 | 9/1993 | Sakamoto | 310/179 |
| 5,289,064 | 2/1994 | Sakamoto | 310/49 R |

OTHER PUBLICATIONS

Seventeenth Annual Symposium, Incremental Motion Control Systems and Devices, Jun. 1988, H. Dohmeki, et al., "Analysis of Harmonic Torque in Stepping Motor", pp. 225–231.

Primary Examiner—Thomas M. Dougherty
Assistant Examiner—Judson H. Jones
Attorney, Agent, or Firm—Oblon, Spivak, McClelland, Maier & Neustadt

[57] ABSTRACT

A hybrid stepping motor in which each of two rotor yokes constituting a rotor is divided in its axial direction into at least two rotor yoke portions, the rotor yoke portions constituting one rotor yoke being made to abut on each other with their pole teeth shifted from each other in angular position by $\theta_0$, the two rotor yoke portions belonging to the two rotor yokes respectively and sandwiching a permanent magnet therebetween being arranged with their pole teeth shifted from each other in angular position by $180/Nr$ degrees ($\pi$ radian in electric angle) under the condition that a relation of $0 < \theta_0 < 90/Nr$ degrees is satisfied, and a rotor of a hybrid stepping motor in which two or more rotor units are arranged with their pole teeth shifted from each other in angular position by an angle smaller than $\frac{1}{4}$ of the angular pitch with which the pole teeth are provided.

5 Claims, 9 Drawing Sheets

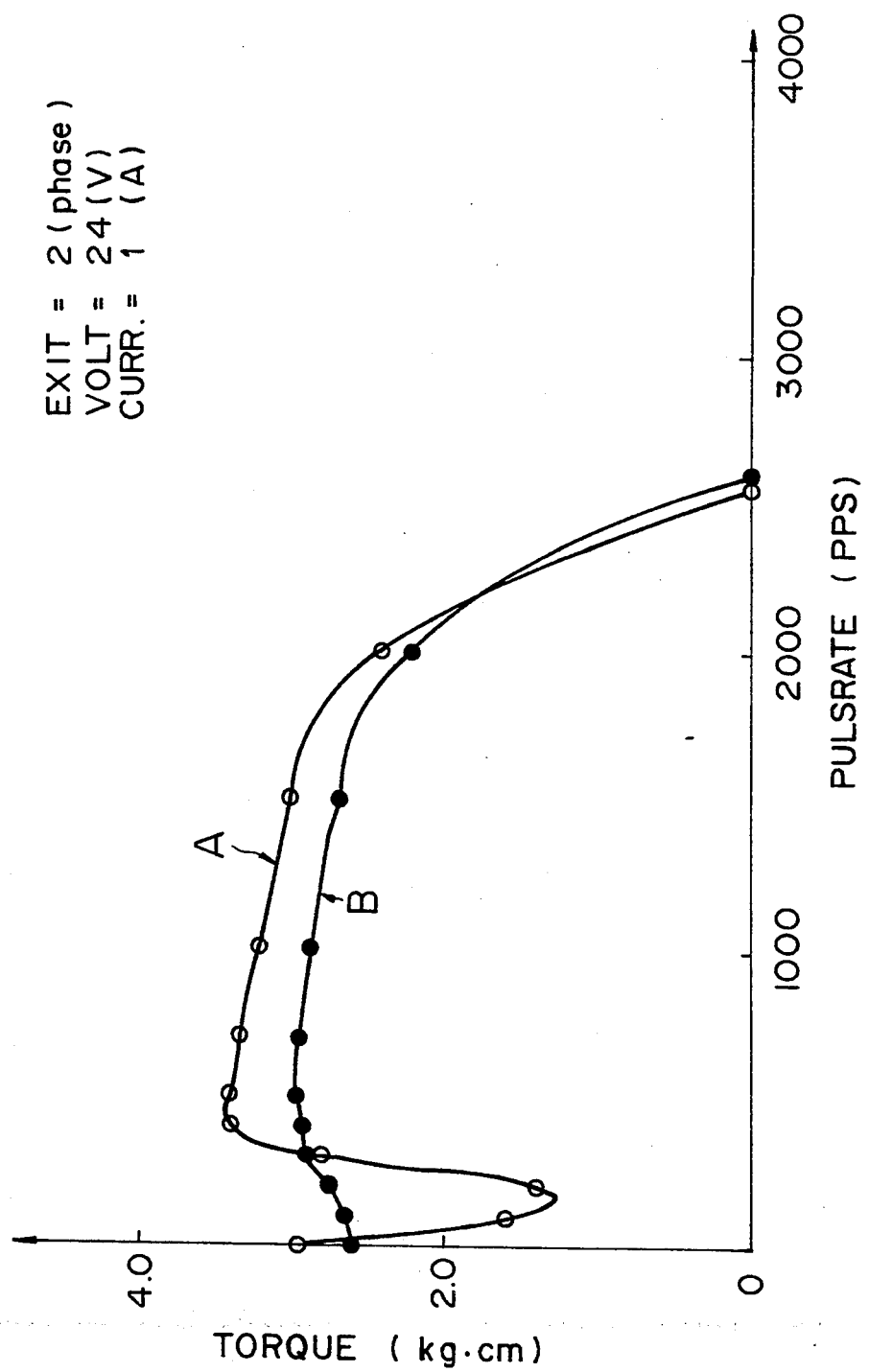

HYBRID TYPE STEPPING MOTOR

BACKGROUND OF THE INVENTION

1. Field of the Invention

The present invention relates to a stepping motor. The invention particularly relates to a hybrid stepping motor which is high in torque and less in vibrations, and to a rotor of such a hybrid stepping motor.

2. Description of the Related Art

Stepping motors of the permanent magnet type are used widely in positioning control, velocity control, or the like, in the field of office automation, factory automation, etc. Further, a synchronous motor in which such a stepping is arranged to be driven by a sinusoidal wave voltage is also used for constant velocity control, and so on.

A stepping motor using a permanent magnet in a rotor or a stator has features that the motor is high efficiency, superior in damping characteristic, etc., in comparison with a stepping motor of the variable reluctance type in which no permanent magnet is used because a permanent magnet is used in a part of a magnetic field in the stepping motor of the permanent magnet type. In such a stepping motor of the permanent magnet type, however, there is a problem that if this stepping motor is subjected to microstep driving in which driving currents of two phases are changed stepwise and relative to each other, the angular accuracy is poor and vibrations are much.

FIG. 9 is a section showing the structure of an inner-rotor type hybrid stepping motor which has been used conventionally; and FIG. 10 is a section along an A—A line in FIG. 9.

As shown in FIG. 9, in an inner-rotor type hybrid stepping motor, a stator 10 in which a winding is wound on a stator iron core is held by end brackets 9 and 11 therebetween and a rotor 12 in which two rotor yokes 12-1 and 12-2 and a permanent magnet 5 sandwiched between the two rotor yokes 12-1 and 12-2 are integrally fixedly mounted on a rotorshaft 6 is disposed inside the stator 10 so as to face the latter through an air gap therebetween and rotatably supported by a pair of bearings 7 and 7 provided on the end brackets 9 and 11 respectively. Each of the rotor yokes 12-1 and 12-2 has pole teeth 8 provided on its radially outer circumference. As shown in FIG. 10 which is a section along an A—A line in FIG. 9, the stator 10 has a plurality of (eight in the illustrated example) magnetic poles $1p$ through $8p$ inwardly radially provided on the inside of a ring-like yoke 10-Y. Each of the magnetic poles $1p$ through $8p$ has a plurality of pole teeth provided on the radially inward end thereof. Windings $1c$ and $2c$ are wound alternately on the magnetic poles $1p$ through $8p$. In each of the rotor yokes 12-1 and 12-2, the pole teeth 8 are provided at equal pitches on the outer circumference thereof so as to be in opposition to the pole teeth of the stator 10 through an air gap therebetween. In the example of the stepping motor illustrated in FIG. 10, since the number $N_r$ of the pole teeth provided on the outer circumference is 50 and the stator 10 has two-phase windings, the step angle $\theta_s$ is 1.8 degrees.

That is, since a phase difference is generated between retention torque Te which is generated when DC currents are made to flow in the the stator windings $1c$ and $2c$ to excite the stator windings and so-called cogging or detent torque Td which is generated in a non-excitation state in which no current is made to flow in the stator windings $1c$ and $2c$, the composite torque Tf has a waveform which is distorted compared with a sinusoidal waveform as shown in FIG. 11 by way of example so that the angular accuracy becomes poor in the case of excitation by microstep driving and vibration becomes large even in the case of driving with sinusoidal currents.

Further, when the output of a motor is to be made high without changing the outer size of the motor, a measure in which two or more rotor units are integrally coupled to a single rotary shaft of the motor to thereby increase the output is widely used. In a hybrid stepping motor having a rotor in which a permanent magnet magnetized in the axial direction of the rotor is held between two rotor yokes each provided with a plurality of pole teeth on its outer circumference, in the case where it is intended to increase the output torque by increasing the axial thickness of the stator, the quantity of generated magnetic flux has a limit even if the thickness of the permanent magnet is increased, and, therefore, a measure in which two or more rotor sets coupled on the same rotor shaft are employed with the stator increased to increase the output torque is used.

FIG. 12 is a section showing the structure of a hybrid stepping motor in which in order to increase the output torque, two rotor sets 12a and 12b are coupled on one and the same rotary shaft 6 to constitute a rotor 12 which is arranged to face a stator 10, FIG. 13 is a detailed section of the rotor portion of FIG. 12, and FIG. 14 is a typical side view showing the arrangement of the pole teeth of the rotor of FIG. 13. The section along the line A—A in FIG. 12 is the same as that shown in FIG. 10.

In FIG. 12, the stator 10 having windings wound thereon is held between end brackets 9 and 11 and the rotor 12 is rotatably supported by a pair of bearings 7 and 7 provided on the end brackets 9 and 11 respectively.

As seen in FIG. 10, the stator 10 of FIG. 12 has a plurality (eight in the illustrated example) of radially provided magnetic poles each of which has a winding wound thereon and has a plurality of pole teeth formed on the radially inward end thereof. The rotor set 12a is constituted by rotor yokes 12-1 and 12-2 and the rotor set 12b is constituted by rotor yokes 12-3 and 12-3, and each of the rotor yokes 12-1, 12-2, 12-3 and 12-4 has pole teeth 8 provided on the outer circumference thereof so as to face the pole teeth of the stator 10.

As shown in FIG. 13 showing the detailed section of the rotor 12, the rotor yokes 12-1 and 12-2 having the same configuration with each other are arranged so as to sandwich a permanent magnet 5 therebetween under the condition that the arrangement of the pole teeth of the rotor yoke 12-1 is displaced in angular position by ½ pitch from the arrangement of the pole teeth of the rotor yoke 12-2 to thereby constitute the first rotor set 12a, and the rotor yokes 12-3 and 12-4 having the same configuration with each other are arranged so as to sandwich another permanent magnet 5 therebetween under the condition that the arrangement of the pole teeth of the rotor yoke 12-3 is displaced in angular position by ½ pitch from the arrangement of the pole teeth of the rotor yoke 12-4 to thereby constitute the second rotor set 12b. The two rotor sets 12a and 12b are fixed on the rotor shaft 6 separately from each other in the axial direction through a spacer 13 therebetween in a manner so that the respective arrangements of the pole teeth of the rotor yokes 12-1 and 12-3 of the respective first and second rotor yokes 12a and 12b are made coincident with each other in angular position and the respective arrangements of the pole teeth of the rotor yokes 12-2 and 12-4 of the respective first and second rotor yokes 12a and 12b are made coincident with each other in angular position.

FIG. 15 shows an example of a stepping or synchronous motor having a rotor constituted by a cylindrical permanent magnet in which in order to increase the output torque, two stator sets 10a' and 10B' having the same configuration with each other are provided and two rotor sets 12A' and 12b' having the same configuration with each other and fixed on one and the same rotor shaft are assembled into one body.

FIG. 16 is a detailed view of the rotor arrangement of FIG. 15, in which the two rotor sets 12a' and 12b' are integrally fixed on the rotor shaft in a manner so that the two rotor sets 12a' and 12b' are axially coincident in polarity with each other.

In such a configuration in which two rotor sets are provided on one and the same rotor shaft as shown in FIGS. 13 trough 16, the torque is increased but the increase of the torque may cause a problem that vibrations and noises are also increased. In a stepping motor, there has been a problem that vibrations and noises are large in comparison with an induction motor or the like and rotation is not smooth by an influence of the cogging torque of the rotor at the time of microstep driving, because the rotor rotates with incremental movement even in the case of using only one rotor set or only one permanent magnet.

SUMMARY OF THE INVENTION

An object of the present invention is to solve the above problems in the prior art so as to obtain a hybrid stepping motor which is high in angular accuracy and less in vibration in the microstep driving system.

According to an aspect of the present invention, the above object is attained by an inner-rotor type hybrid stepping motor in which each of two rotor yokes constituting a rotor is divided in its axial direction into at least two rotor yoke portions each of which has pole teeth of Nr in number, wherein the at least two rotor yoke portions of each of the two rotor yokes are arranged with the pole teeth of one rotor yoke portion being shifted in angular position by $\theta_0$ degrees from the pole teeth of the other rotor yoke portion, and wherein the two rotor yokes are arranged so that the pole teeth of one of the two facing rotor yoke portions belonging to the two rotor yokes respectively and sandwiching a permanent magnet therebetween are shifted in angular position by 180/Nr degrees ($\pi$ radian in electric angle) from the pole teeth of the other of the two facing rotor yoke portions and so that a relation of $0 < \theta$ degrees $< 90/Nr$ degrees is satisfied.

In the above configuration according to the present invention, the two rotor yoke portions of each of the two rotor yokes are arranged with the pole teeth of one rotor yoke portion being shifted in angular position by $\theta_0$ degrees from the pole teeth of the other rotor yoke portion, so that the detent torques acting on the pole teeth of the respective rotor yoke portions of each of the two rotor yokes are different in phase from each other to thereby cancel each other so that the total detent torque decreases. Particularly in the case where the angle $\theta_0$ is selected to be $\pi$, the phase difference between the detent torques acting on the pole teeth of the respective rotor yoke portions of each of the two rotor yokes is 180 degrees so that they are entirely canceled to be zero so that the waveform of the composite output torque becomes substantially sinusoidal to improve the angular accuracy in the case of microstep driving.

Another object of the present invention is to solve the above problems in the prior art so as to obtain a permanent type rotor which makes the torque large, makes the angular accuracy high and reduces vibrations and noises.

According to the present invention, the above problems can be solved by arranging two rotor sets with their pole teeth shifted from one another in angular position by a certain angle in a hybrid type rotor, or by arranging two permanent magnets with their pole teeth shifted from one another in angular position by a certain angle in a rotor constituted by only the two permanent magnets.

As a result of inspection, it has been found that vibrations and noises caused in rotation of a stepping motor are generated mainly by odd order higher harmonics of the interlinkage magnetic flux of the permanent magnet or the rotor. Accordingly, the problem can be solved by the arrangement in which two rotor sets are disposed with their pole teeth shifted from one another in angular position by a certain angle so that high harmonic torques generated by the respective rotor sets are canceled with each other.

BRIEF DESCRIPTION OF THE DRAWINGS

FIG. 18 is a characteristic diagram showing comparison between the torque characteristic of the conventional motor and of the motor according to the present invention.

DESCRIPTION OF THE PREFERRED EMBODIMENTS

Next, embodiments of the present invention will be described with reference to the accompanying drawings.

Figure 1:
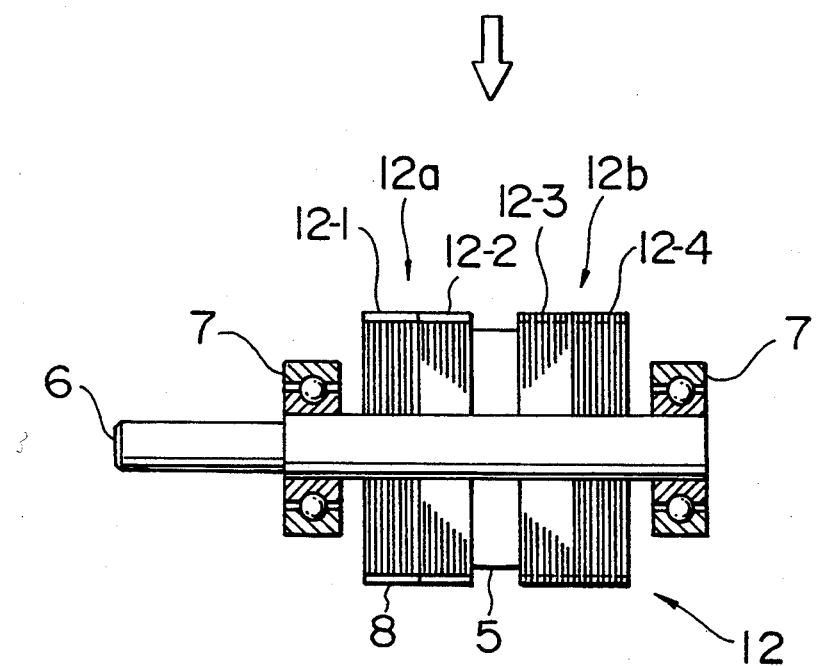
FIG. 1 is a sectional view showing a rotor according to a first embodiment of the present invention.
Figure 2:
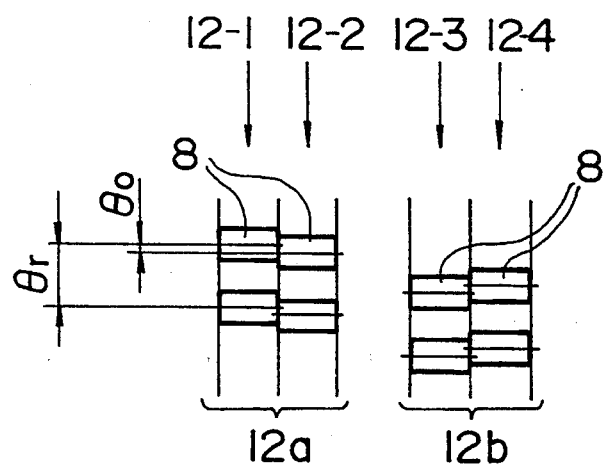
FIG. 2 is a schematic side view showing the rotor of FIG. 1 when viewed from the direction of an arrow.

FIG. 1 is a sectional view showing the structure of an inner-rotor type hybrid rotor according to a first embodiment of the present invention, and FIG. 2 is a side view showing the positional relation of the pole teeth of rotor yokes.

In FIGS. 1 and 2, each of rotor yokes 12-1, 12-2, 12-3, and 12-4 is provided with pole teeth 8 of Nr in number formed at equal pitches at its outer circumference. The rotor yokes 12-1 and 12-2 are arranged with their pole teeth shifted from each other in angular position by $\theta_0$ degrees, and the rotor yokes 12-1 and 12-2 are integrally fixed with each other so as to constitute a first rotor yoke unit 12a.

Similarly to this, the rotor yokes 12-3 and 12-4 are arranged with their pole teeth shifted from each other in angular position by $\theta_0$ degrees and the rotor yokes 12-3 and 12-4 are integrally fixed with each other so as to constitute a second rotor yoke unit 12b.

Further, the rotor yokes 12-1 and 12-4 are shifted from each other in angular position by 180/Nr degrees (that is, ½ of the pitch of the pole teeth), the rotor yokes 12-2 and 12-3 are shifted from each other in angular position by 180/Nr degrees, and the rotor yokes 12-2 and 12-3 are fixed on a rotary shaft 6 with a permanent magnet 5 sandwiched therebetween.

Here, if the rotor yokes 12-1 and 12-2 are shifted from each other in angular position by $\theta_0$ degrees and the rotor yokes 12-3 and 12-4 are shifted from each other in angular position by $\theta_0$ degrees, the rotor yokes 12-1 and 12-3 may be shifted from each other in angular position by 180/Nr degrees and the rotor yokes 12-2 and 12-4 may be shifted from each other in angular position by 180/Nr degrees.

Figure 9:
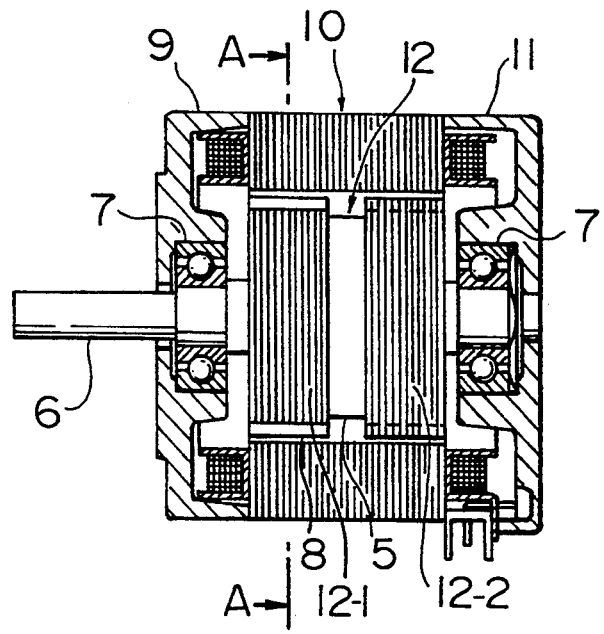
FIG. 9 is a sectional view showing the structure of a hybrid stepping motor having the conventional inner rotor.

If the rotor of FIG. 1 is incorporated, as the rotor, into of the conventional stepping motor of FIG. 9, it is possible to solve the problems in the prior art.

Figure 11:
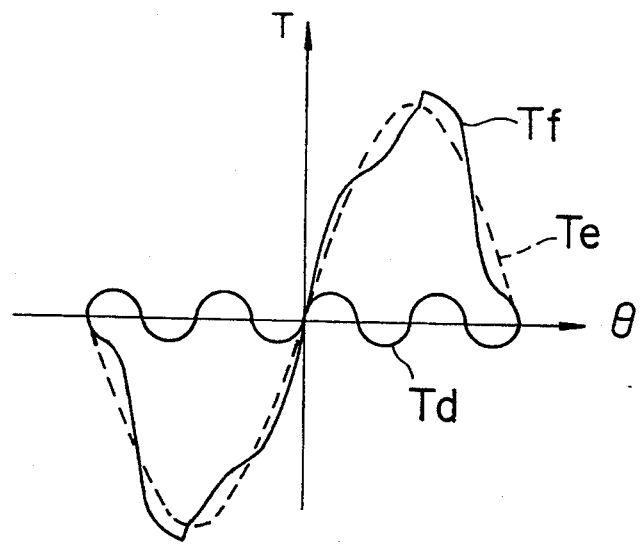
FIG. 11 is a characteristic diagram showing the retention torque of the conventional stepping motor.
Figure 12:
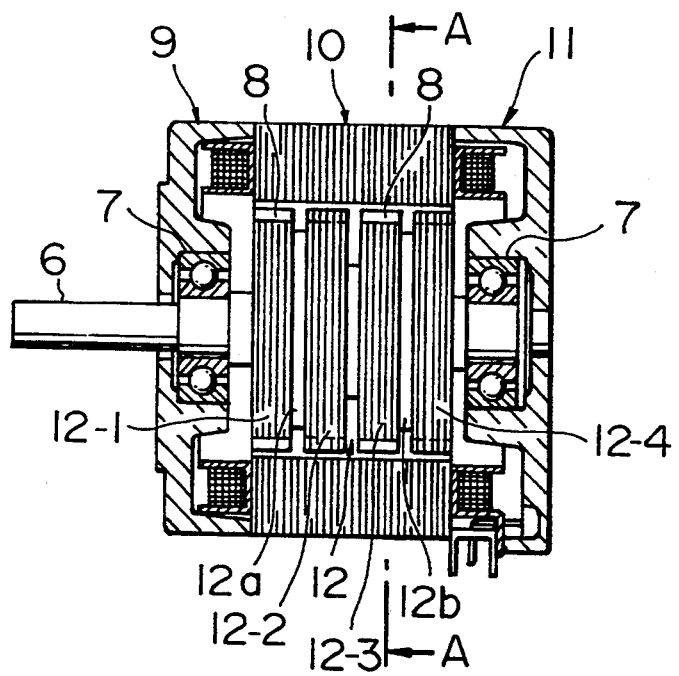
FIG. 12 is a sectional view showing another example of the conventional stepping motor.

FIG. 11 shows the characteristic of the retention torque of the conventional stepping motor of FIG. 9. That is, FIG. 11 shows the relation of the retention torque Te when a direct current has been made to flow into the winding, the cogging torque Td in non-excitation, and the composite torque Tf.

Since the cogging torque Td in a two-phase hybrid stepping motor has a higher harmonic with respective to the retention torque Te generated when direct currents are made to flow into the windings, distortion is generated in the composite torque Tf. In a two-phase motor, it is known that Td becomes four-fold harmonic with respect to the detention torque Te.

Figure 3:
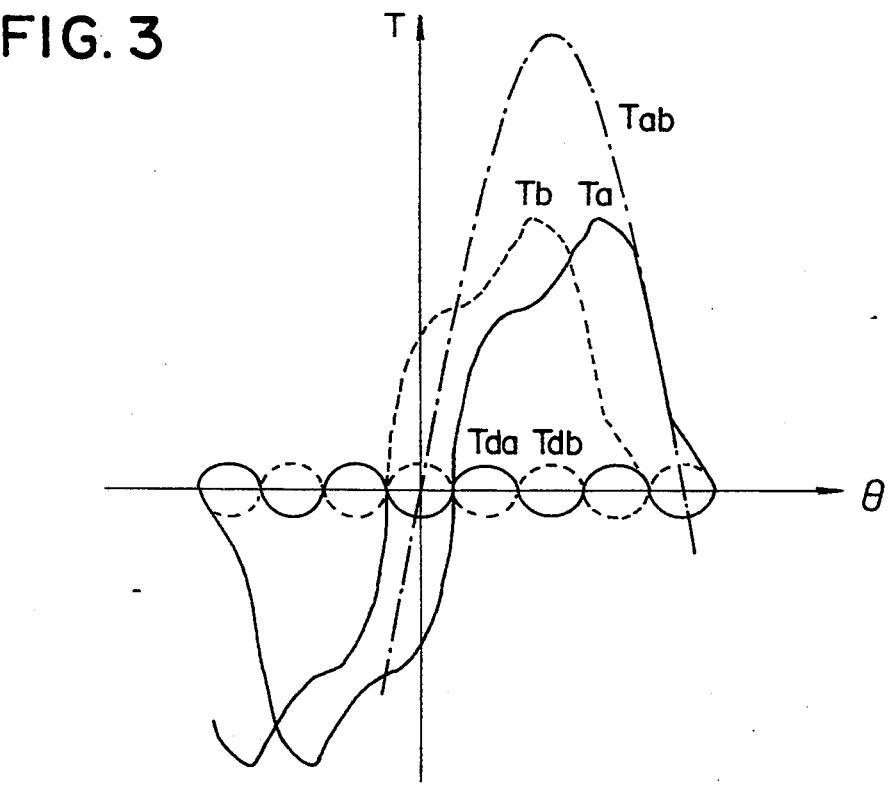
FIG. 3 is a characteristic diagram showing the retention torque of the stepping motor according to the present invention.

FIG. 3 shows the characteristic of retention torque of an improved stepping motor in which the rotor of FIG. 1 according to the present invention is incorporated into the conventional stepping motor of FIG. 9. That is, FIG. 3 shows data when the shift angle $\theta_0$ between the pole teeth of the two rotor yokes was selected to be $\pi/4$ in electric angle. When the detent torques owing to the rotor yokes 12-1 and 12-4 and owing to the rotor yokes 12-2 and 12-3 in non-excitation are represented by Td$a$ and Td$b$ respectively, the phase difference is 180 degrees so that the respective detent torques cancel each other to be zero. When direct currents are made to flow into the windings, the torque generated in the rotor yokes 12-1 and 12-4 is distorted by Td$a$ to generate a composite torque Ta and the torque generated in the rotor yokes 12-2 and 12-3 is distorted by Td$b$ to generate a composite torque Tb. However, the waveform of the composite torque Tab owing to Ta and Tb becomes sinusoidal wave.

Since the waveform of the retention torque Tab (shown as excitation torque of one phase in FIG. 3) in excitation is sinusoidal, the waveform of the composite torque is sinusoidal even in the case of two-phase excitation. Consequently, the stepping angular accuracy is improved in the case of microstep driving and vibrations can be reduced in continuous rotation.

Further, when each of the rotor yokes 12-1 and 12-2 of FIG. 9 is divided into at least two rotor yoke portions, it is preferable to select the total shift angle $\Sigma\theta_0$ to satisfy the relation of $0 < \Sigma\theta_0 < \pi/2$. For example, in the case of division into three rotor yoke portions, the angle $\theta_0$ is selected so as to satisfy the relation of $0 < 2\theta_0 < \pi/2$.

Moreover, the same effects are obtained also when the stator iron cores, in place of the rotor yokes in the structure defined in Claim 1, are shifted from each other in angular position of their pole teeth. This arrangement may be realized by shifting the respective pole teeth of the stators facing the rotor yokes 12-1, 12-2, 12-3, and 12-4 are shifted from each other in angular position by $\theta_0$ degrees.

Figure 4:
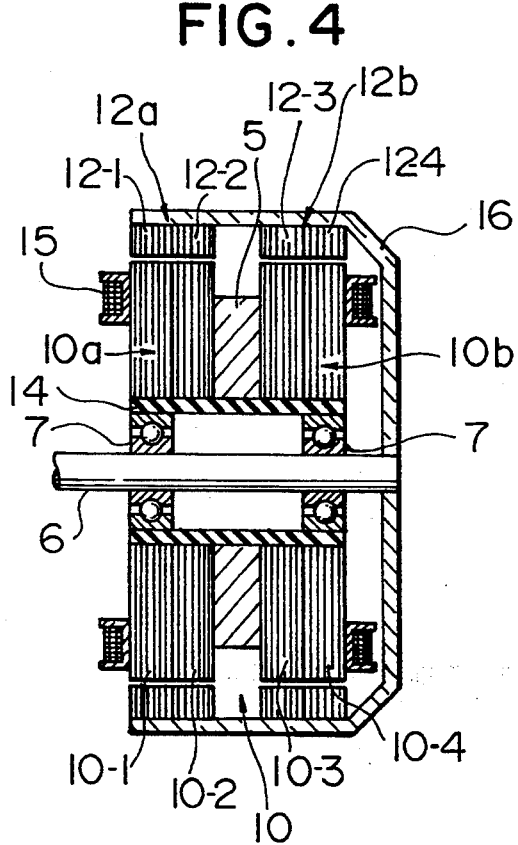
FIG. 4 is a sectional view showing the structure of an outer-rotor type stepping motor according to second and third embodiments of the present invention.

FIG. 4 is a sectional view showing the structure when the present invention is applied to an outer-rotor type stepping motor. Iron cores 10$a$ and 10$b$ of a stator 10 are fixed on a bearing bracket 14 with a permanent magnet 5 sandwiched therebetween and each of the iron cores 10$a$ and 10$b$ has a plurality of magnetic poles radially formed thereon. Each of the magnetic poles has pole teeth formed on its radially outward end. A winding 15 is wound on each of the magnetic poles of each of the stator iron cores. A bowl-like rotor yoke 16 is fixed on one end of a rotary shaft 6 rotatably supported by bearings 7 and 7 provided on the bearing bracket 14. Rotor iron cores 12$a$ and 12$b$ are fixed in the inside of the rotor yoke 16, and pole teeth of Nr in number are provided on the inner side of each of the rotor iron cores 12$a$ and 12$b$ so that the pole teeth of the respective rotor iron cores 12$a$ and 12$b$ face, though an air gap, the pole teeth provided on the radially outward ends of the magnetic poles of the respective stator iron cores 10$a$ and 10$b$.

Also in the outer-rotor type stepping motor of FIG. 4, each of the stator iron cores 10$a$ and 10$b$ is divided in its axial direction into stator iron core portions 10-1 and 10-2, 10-3 and 10-4 each having substantially half axial length. The stator iron core portions 10-1 and 10-2 are integrally fixed with each other with their pole teeth shifted in angular position by $\theta_0$ degrees and the stator iron core portions 10-3 and 10-4 are integrally fixed with each other with their pole teeth shifted in angular position by $\theta_0$ degrees. The front half stator iron core portion 10-1 of the stator iron core 10$a$ and the rear half stator iron core portion 10-4 of the stator iron core 10$b$ are arranged with the permanent magnet 5 sandwiched therebetween and with their pole teeth shifted from each other in angular position by 180/Nr degrees. The pole teeth of the respective rotor iron cores 12a and 12b facing each other through an air gap are aligned with each other on the other hand. Alternatively, each of the rotor iron cores 12a and 12b is divided in its axial direction into rotor iron core portions each having substantially half axial length. The rotor iron core portions 12-1 and 12-2 are integrally fixed with each other with their pole teeth shifted from each other in angular position by $\theta_0$ degrees, and the rotor iron core portions 12-3 and 12-4 are integrally fixed with each other with their pole teeth shifted from each other in angular position by $\theta_0$ degrees. The front half rotor iron core portion 12-1 of the rotor iron core 12a and the rear half rotor iron core portion 12-4 of the rotor iron core 12b are arranged with their pole teeth shifted from each other in angular position by 180/Nr degrees. The pole teeth of the respective stator iron cores 10a and 10b facing each other through an air gap are aligned with each other on the other hand. The portion 12-4 of the rotor iron core 12b; and all the pole teeth of the stator iron cores 10a and 10b faced through the gap, on the contrary, are linearly arranged.

In the configuration as shown in FIG. 4, since the stator iron core portions each having substantially half axial length are arranged with their pole teeth shifted from each other in angular position by $\theta_0$ degrees, the detent torques owing to the pole teeth of the stator iron cores are canceled with each other so as to be reduced. Also in the configuration where the rotor iron cores are shifted from each other in angular position by $\theta_0$ degrees, the detent torques owing to the pole teeth of the rotor iron cores are canceled with each other to so as to be reduced. Further, the shift angle between the pole teeth is selected so as to satisfy the relation of $0 < \theta_0 < \pi/2$ (electric angle) in the same manner as in the inner-rotor type of FIG. 1, and, for example, in the case of $\theta_0 = \pi/4$, the detent torque is equal to zero and the stepping motor of FIG. 4 is made suitable for microstep driving.

In the thus configured hybrid stepping motor according to the present invention, the pole teeth of divisional stator portions or divisional rotor iron core portions are shifted from each other in angular position so that the detent torque is reduced and the waveform of the torque can be approximated to be sinusoidal. There is therefore such an effect that the angular accuracy in microstep driving can be improved to reduce vibrations and noises. Further, the present invention is effectively applied to three-phase or more hybrid stepping motors.

Figure 5:
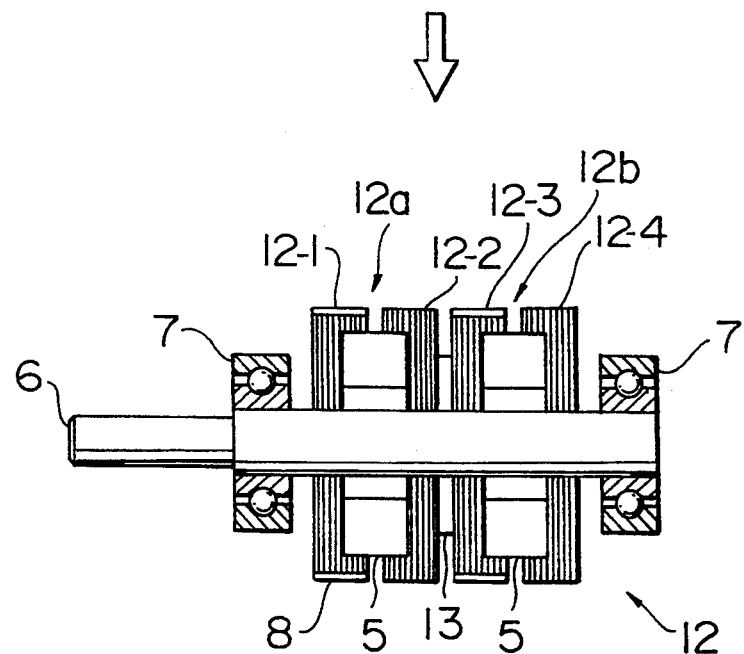
FIG. 5 is a sectional view showing a rotor according to a fourth embodiment of the present invention.
Figure 6:
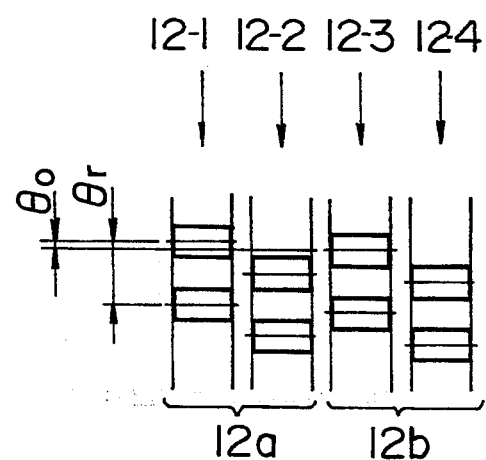
FIG. 6 is a schematic side view showing the rotor of FIG. 5 when viewed from the direction of an arrow.

FIG. 5 is a sectional view showing the structure of a hybrid rotor according to a fourth embodiment of the present invention, and FIG. 6 is a side view showing the positional relation of pole teeth of rotor yokes thereof.

Figure 13:
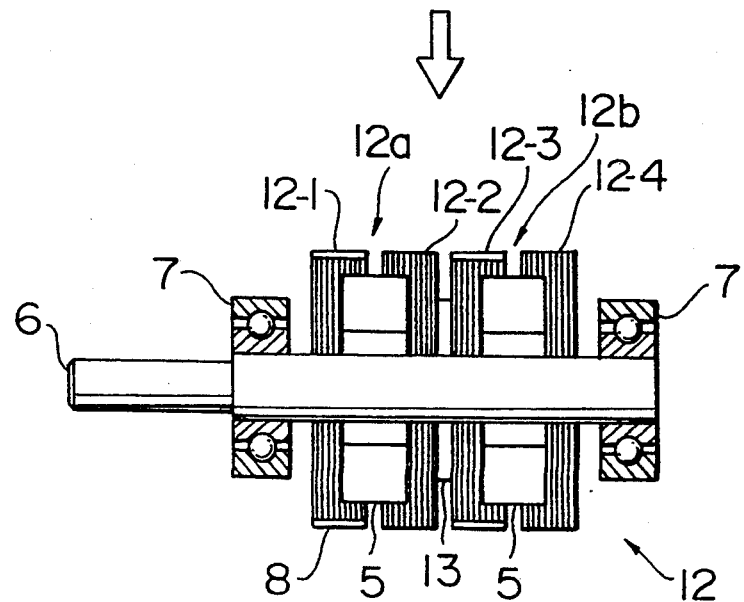
FIG. 13 is a sectional view showing a conventional rotor.
Figure 14:
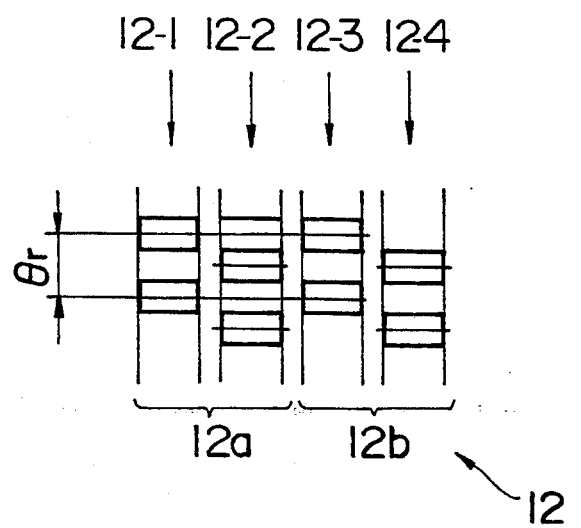
FIG. 14 is a schematic side view showing the rotor of FIG. 13 when viewed from the direction of an arrow.

Although FIGS. 5 and 6 correspond to FIGS. 13 and 14 showing the prior art respectively, the rotor of FIGS. 5 and 6 is different from the conventional rotor of FIGS. 13 and 14 in that pole teeth of a rotor yoke 12-1 of a first rotor unit 12a are shifted in angular position by a certain angle from pole teeth of a rotor yoke 12-3 of a second rotor unit 12b.

That is, the rotor yokes 12-1 and 12-3 are circumferentially shifted from each other in angular position by $\theta_0$ as shown in FIG. 6 in the fourth embodiment, although the rotor yokes 12-1 and 12-3 are axially aligned in the prior art of FIG. 14.

Description will be made as to the relation between the shift angle $\theta_0$ between the pole teeth of the two rotor units of the hybrid rotor according to the present invention and the function of reducing vibrations.

Now, assume that a stator of the stepping motor which will be now described has two-phase windings. Vibrations are generated in the rotating operation of a rotor because of the existence of odd order higher harmonics interlinking with the stator windings during rotation of the rotor.

That is, because of two-phase excitation, consideration is made on a case where magnetic flux interlinking with the windings of the two phases a and b is expressed as follows.

$$\lambda_a = \Phi_m[k_1 \cos\theta + k_3 \cos 3\theta] \quad (1)$$

$$\lambda_b = \Phi_m[k_1 \sin\theta - k_3 \sin 3\theta] \quad (2)$$

The torque generated at this time is expressed as follows:

$$T = \frac{e\lambda_i}{e\theta} i$$

When the expressions (1) and (2) is substituted into $\lambda_i$, the following expression (3) is obtained because the total torque is the sum of the torques for the phases a and b.

$$T = -\Phi_m[ia\{k_1 \sin\theta + 3k_3 \sin 3\theta\} - ib\{k_1 \cos\theta - 3k_2 \cos 3\theta\}] \quad (3)$$

Assuming that the currents in the stator windings are changed sinusoidally, the currents in the respective phases are expressed as follows.

$$ia = I_m \cos(\omega t + \alpha)$$

$$ib = I_m \sin(\omega t + \alpha)$$

If these expressions are substituted into the expression (3), the following expression is obtained.

$$T = \Phi_m I_m[k_1 \sin(\omega t + \alpha - \theta) - 3k_3 \sin(\omega t + \alpha + 3\theta)] \quad (4)$$

In this case, the position satisfying the relation of $\omega t + \alpha - \theta = 0$ is a stable position at that time.

Assuming that $\alpha = 0$, the following expression (5) is established from the expression (4) when the condition of $\omega t - \theta = 0$ is satisfied.

$$T = -3\Phi_m I_m k_3 \sin 4\theta \quad (5)$$

As a result, the fourth harmonic torque is generated.

The fourth harmonic torque reduces the angular accuracy in microstep driving and causes vibrations.

In the case of using two rotor units, if the pole teeth of a first rotor unit are shifted in angular position by $\theta_0$ degrees from the pole teeth of a second rotor unit corresponding to the first rotor unit as shown in FIG. 6 as the structure of the rotor according to the present invention, the total higher harmonic torque is expressed as follows through the expression (5).

$$T = -3\Phi_m I_m k_3 [\sin 4\theta - \sin(4\theta + 3\theta_0)]$$

Since $3\theta_0 = \pi$ when $T = 0$ is established in the above expression, it is preferable to select $\theta_0$ to be $\pi/3$.

Figure 10:
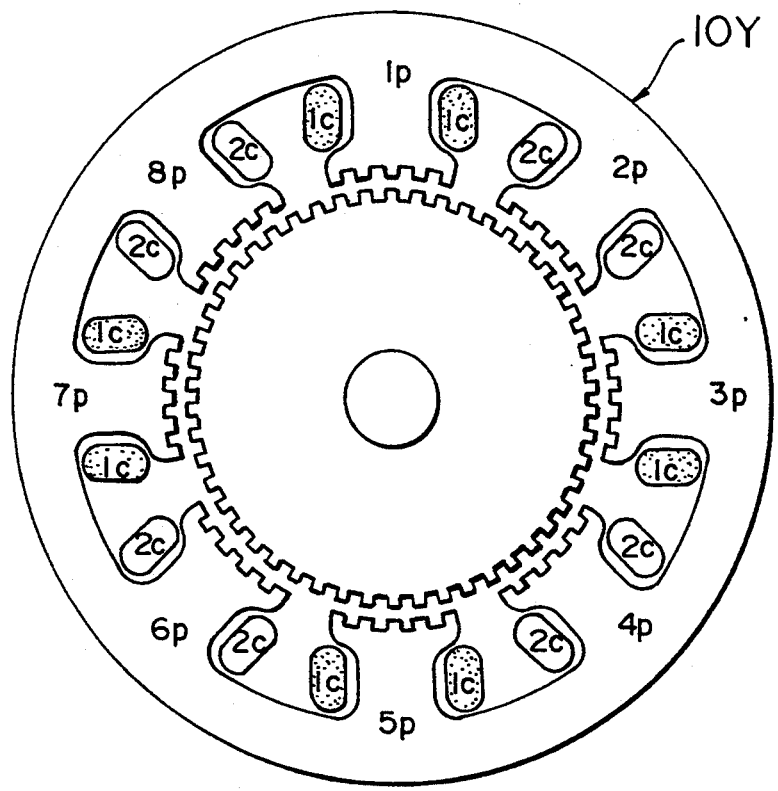
FIG. 10 is a sectional view taken on line of A—A of the conventional stepping motor of FIG. 9.

That is, the pole teeth of the two rotor units are shifted from each other in angular position by 60 degrees (1.2 degrees in a mechanical angle when the number of pole teeth of the rotor yoke is 50 in FIG. 10) in an electric angle so that the fourth harmonic torque generated by the third higher harmonic component of interlinkage magnetic flux can be made zero.

Similarly to this, in order to nullify the fourth harmonic torque generated by the fifth higher harmonic components of the interlinkage magnetic flux, it is preferable to establish $\theta_0 = \pi/5$.

In the case of using three rotor units, similarly to the above case, it is preferable to arrange the rotor units in a manner as follows though the explanation of the expressions will omitted here.

In order to nullify the torque due to a third higher harmonic: $\theta_0 = 2\pi/9$ In order to nullify the torque due to a fifth higher harmonic: $\theta_0 = 2\pi/15$.

Accordingly, in an example using two rotor units in a widely used two-phase motor, it is considered from the foregoing results that in order to minimize torque due to third and fifth higher harmonics it is preferable to establish the following relation.

$$\pi/5 \leq \theta_0 \leq \pi/3 \tag{6}$$

Next, in the case of a three-phase motor, no torque due to a third higher harmonic is generated and torque due to a fifth higher harmonic appears. Accordingly, it is preferable to establish the following conditions.

In the case of using two rotor units: $\theta_0 = \pi/5$
In the case of using three rotor units: $\theta_0 = 2\pi/15$ In the case of a four-phase motor, no torque due to third and fifth higher harmonics is generated and torque of an eighth higher harmonic due to interlinkage components of seventh and ninth higher harmonics is generated. According to a result of the calculation, it is preferable to establish the following conditions.

In the case of using two rotor units: $\theta_0 = \pi/7$
In the case of using three rotor units: $\theta_0 = 2\pi/21$ Although a description has been made as to torque generated when sinusoidal currents are made to flow into stator windings in the foregoing case, it is known that so-called cogging torque (or detent torque) is generated even in a non-excitation state where no current is made to flow into the stator windings because a permanent magnet is used in a rotor. In a two-phase motor as shown, by way of example, in FIG. 11, it is known that the torque Te indicated with a broken line is retention torque which is generated when direct currents are made to flow into the windings and which sinusoidally changes, while the torque Td is torque which is generated in a non-excitation state and which has a frequency four times as high as the torque Td. Consequently, the torque Tf actually generated becomes Tf=Te+Td and it has a distorted waveform.

It is known that as the torque Tf is approximated to a sinusoidal wave to the utmost, the angular accuracy of the stepping movement of the rotor in microstep driving is improved and vibrations in motor driving can be reduced.

Next, an explanation will be made as to the reason why the cogging torque can be theoretically made zero by arranging two or more rotor units with angular positional shift and, therefore, the actual retention torque can be approximated to a sinusoidal wave.

In the case of using two rotor units in an example of a two-phase machine and when the pole teeth shifting angle $\theta_0$ between the two rotor units is selected in the range of angle of the expression (6) to be $\theta_0 = \pi/4$, it is assumed that the cogging torque generated in a first rotor unit is represented by Td$a$, the actual retention torque distorted by the cogging torque Td$a$ is represented by Ta, the cogging torque generated in a second rotor unit is represented by Td$b$, and the actual retention torque distorted by the cogging torque Td$b$ is represented by Tb. Then, since the pole teeth shifting angle $\theta_0$ between the two rotor units is selected to be $\theta_0 = \pi/4$, the fourth higher harmonic cogging torques Td$a$ and Td$b$ are different in phase by 180 degrees so that those torques are canceled by each other so as to be nullified. This state is shown in FIG. 3.

Accordingly, although the actual retention torque of each of the two rotor units is distorted by the cogging torque, the respective cogging torques in the two rotor units are canceled with each other by the arrangement of the two rotor units with the pole teeth shifting angle $\theta_0$ between the two rotor units selected to be $\theta_0 = \pi/4$, so that the composite retention torque Tab changes sinusoidally. Thus the defects of the stepping motor in the prior art are eliminated by suitable selection of the pole teeth shifting angle $\theta_0$ as described above.

Next, description will be made as to an effective upper limit of the pole teeth shifting angle $\theta_0$.

It is known that the step angle $\theta_s$ of a stepping motor is determined on the basis of the following expression (7).

$$\theta_s = \theta_r / 2P \tag{7}$$

In the expression (7), $\theta_r$ represents a pitch angle of the pole teeth of one rotor yoke as shown in FIGS. 6 and 14, and P represents the number of phases of the windings of the motor.

For example, assuming the number of pole teeth of the rotor yoke is 50 in a two-phase motor, $\theta_s = 7.2/2 \times 2 = 1.8$ degrees because $\theta_r = 360/50 = 7.2$.

That is, $\theta_s$ is $\frac{1}{4}$ of $\theta_r$ in the case of a two-phase motor, $\theta_s$ is 1/6 of $\theta_r$ in the case of a three-phase motor, and $\theta_s$ is $\frac{1}{8}$ of $\theta_r$ in the case of a four-phase motor.

Here, consideration is made on the case where the pole teeth shifting angle $\theta_0$ between the rotor units according to the present invention is made to coincide with the step angle $\theta_s$, then it is found that the pole teeth of the second rotor unit are coincident with the pole teeth of the stator of the second phase in the case where the winding of the first phase is excited and the pole teeth of the first rotor unit are coincident with the pole teeth of the stator of the first phase, so that the motor cannot operate as a stepping motor. It is therefore necessary that the pole teeth shifting angle $\theta_0$ is selected to be smaller than the step angle $\theta_s$.

In the case of a motor such as a three-phase motor, a four-phase motor, or the like, which is larger in the number of phases than a two-phase motor, it is found from the expression (7) that even in the case of a rotor having the same $\theta_r$ as that in the case of a two-phase motor, the step angle $\theta_s$ is smaller than in the two-phase motor and therefore the upper limit of $\theta_0$ is smaller than $\theta_s$ in the case of the two-phase motor.

The present invention may be applied to a hybrid rotor which has such a structure as shown in FIG. 5 but the spacer 13 is removed so that the rotor yokes 12-2 and 12-3 are made to directly abut on each other and two permanent magnets 5 are magnetized respectively in the directions opposite to each other.

Next, a fifth embodiment of the present invention will be described.

Figure 15:
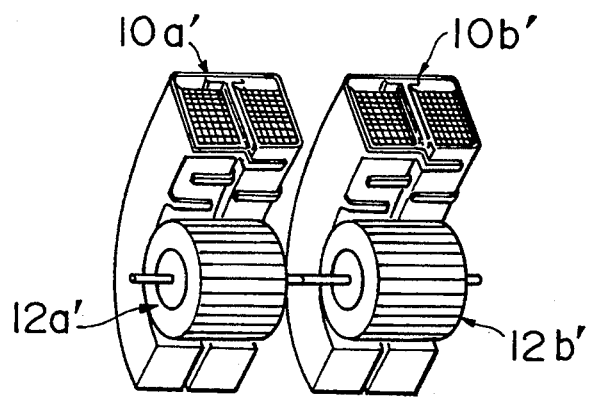
FIG. 15 is a partial sectional view showing the structure of a further example of the conventional stepping motor.
Figure 16:
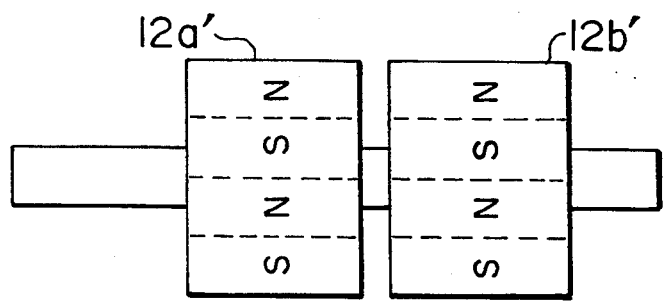
FIG. 16 is a schematic side view showing the conventional stepping motor of FIG. 15.

FIG. 15 is a sectional view showing a conventional structure of a stepping motor or a synchronous motor having a rotor using permanent magnets, to which structure the present invention is applied to carry out the fifth embodiment. In FIG. 15, in order to increase the output torque, two stator units 10a' and 10b' which are the same in structure and two permanent magnet rotor units 12a' and 12b' which are the same in structure are arranged on one and the same axis and the two rotor units 12a' and 12b' are fixedly mounted on a single rotary shaft. The respective magnetic pole arrangements of the two rotor units are axially aligned as shown in FIG. 16.

Similarly to the case of hybrid stepping motor described above, the motor of FIG. 15 has a problem that vibrations and noises are large while its output torque can be made large.

For the same reasons as in the foregoing hybrid stepping motor, the problem can be solved by arranging the two permanent magnet rotor units while shifting, in angular position, the magnetic poles between the two permanent magnet rotor units by an angle of $\theta_0$ in the fifth embodiment according to the present invention.

Figure 7:
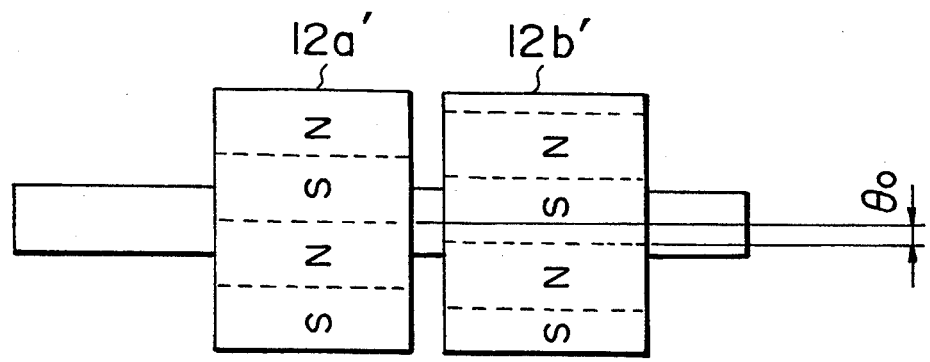
FIG. 7 is a schematic view showing a rotor according to a fifth embodiment of the present invention.

FIG. 7 shows a side view showing the structure of the rotor of the fifth embodiment. The first and second permanent magnet rotor units 12a' and 12b' are arranged with their magnetic poles shifted from each other in angular position by $\theta_0$. The magnetic pole shifting angle $\theta_0$ is selected to be smaller than an angle corresponding to ½ of the pitch of adjacent two north and south magnetic poles of the permanent magnet so as to provide an effect that higher harmonic torque is reduced to thereby reduce vibrations and noises in the same manner as in the foregoing hybrid stepping motor.

The same effect as in the above case can be obtained in the case where one permanent magnet structure in which a single permanent magnet having an axial length which is equal to the axial length of the one permanent magnet structure in which two permanent magnets are mounted on one rotary shaft as shown in FIG. 7 is provided and the single permanent magnet is magnetized so that an axially half part of the single permanent magnet has magnetic poles shifted in angular position by an angle smaller than ½ of the angular pitch between adjacent two, north and south poles from the magnetic poles of the axially other half part of the single permanent magnet.

The effects of the stepping motor having the permanent magnet rotor according to the present invention will be described under with data about the improvement of the characteristics.

(1) The data in which vibration characteristics are compared under the same driving condition in a two-phase motor using two rotor units will be described by referring to FIGS. 8 and 17.

Figure 8:
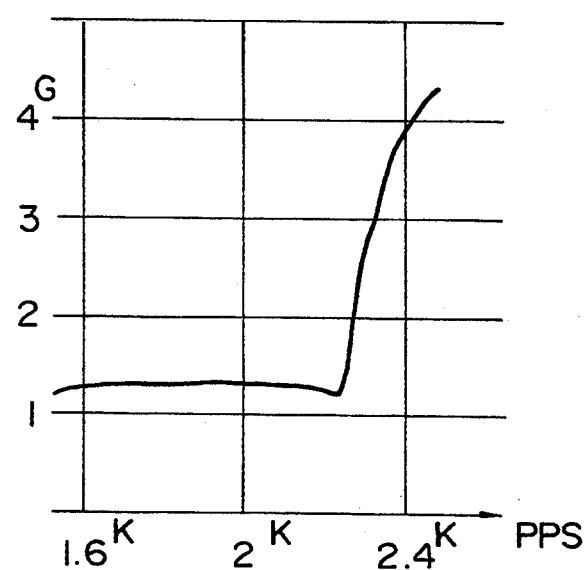
FIG. 8 is a characteristic diagram showing measured vibration of a stepping motor using the rotor according to the present invention.
Figure 17:
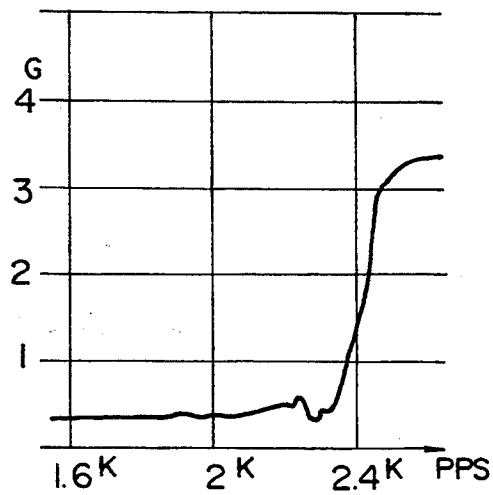
FIG. 17 is a characteristic diagram showing measured vibration of the conventional stepping motor.

FIG. 8 shows the vibration characteristic in a stepping motor in which the rotor units are arranged with their pole teeth shifted by $\theta_0 = \pi/3$ according to the present invention, and FIG. 17 shows the vibration characteristic in a conventional stepping motor in which the rotor units are arranged with their pole teeth not shifted.

In comparison between the data of the two cases, it is founded that the vibrations in the motor according to the present invention is reduced to ⅓ of the vibrations in the conventional motor in the range of from 1.6 to 2.2 K.P.P.S. of the driving frequency.

(2) FIG. 18 shows data showing the changes in torque when the driving frequency is changed. In FIG. 18, as shown in the curve A, the torque is reduced largely in the vicinity of 200 pps in the conventional motor, while as shown in the curve B, the characteristic of the motor according to the present invention is stable as a whole, in which the torque is not lowered in the same frequency band while it is reduced in the range of from 400 pps to 200 pps in comparison with the motor in the prior art.

(3) The permanent magnet type rotor has an advantage that a remarkable effect can be obtained with a simple structure in which the angular position of the respective pole teeth of a plurality of rotor units are shifted from each other. The invention has a further effect in the industrial viewpoint that the invention has an economical configuration which can be attained by preparation of only a jig for shifting the angular position of the pole teeth of the rotor units.

Although the present invention has been described about a hybrid stepping motor, the same effects can be obtained in the case where the motor of the same structure is operated as a synchronous motor by making sinusoidal wave currents into the stator windings.

What is claimed is:

1. An inner-rotor type hybrid stepping motor, comprising: a rotor having a permanent magnet sandwiched between two rotor yokes each of which is made of magnetic material and provided with a plurality of pole teeth formed at equal pitches on its outer circumference, wherein each of said rotor yokes is divided in its axial direction into at least two rotor yoke portions each of which has the pole teeth of Nr in number, wherein said at least two rotor yoke portions of each of said two rotor yokes are arranged so as to abut on each other with the pole teeth of one rotor yoke portion being shifted in angular position by $\theta_0$ from the pole teeth of the other rotor yoke portion, and wherein said two rotor yokes are arranged so that the pole teeth of one of the two facing rotor yoke portions belonging to said two rotor yokes respectively and facing each other with said permanent magnet sandwiched therebetween are shifted in angular position by 180/Nr degrees ($\pi$ radian in electric angle) from the pole teeth of the other of said two facing rotor yoke portions and so that a relation of $0 < \theta < 90/Nr$ degrees is satisfied.

2. An outer-rotor type hybrid stepping motor, comprising: a stator and a ring-like rotor arranged outside said stator so as to face said stator, said stator comprising two ring-like stator yokes having stator iron cores respectively and a permanent magnet sandwiched between two stator iron cores, each of said two stator iron cores having magnetic poles radially formed on its outer circumference, each of said magnetic poles having pole teeth formed on its outer end and having a winding wound thereon, said ring-like rotor having pole teeth of Nr in number formed on its inner circumference, wherein each of said two stator iron cores is divided in its axial direction into at least two stator iron core portions, wherein said at least two stator iron core portions of each of said two stator iron cores are fixed to each other with the pole teeth of one stator iron core portion being shifted in angular position by $\theta_0$ from the pole teeth of the other stator iron core portion, the angle $\theta_0$ being selected so as to satisfy a relation of $0<\theta_0<90$ degrees ($\pi/2$ radian in electric angle).

3. An outer-rotor type hybrid stepping motor, comprising: a stator and a ring-like rotor arranged outside said stator so as to face said stator, said stator comprising two ring-like stator yokes having stator iron cores respectively and a permanent magnet sandwiched between two stator iron cores, each of said two stator iron cores having magnetic poles radially formed on its outer circumference, each of said magnetic poles having pole teeth formed on its outer end and having a winding wound thereon, said ring-like rotor having pole teeth of Nr in number formed on its inner circumference, wherein each of said two stator iron cores is divided in its axial direction into at least two stator iron core portions, wherein said at least two stator iron core portions of each of said two stator iron cores are fixed to each other with the pole teeth of one stator iron core portion being shifted in angular position by $\theta_0$ from the pole teeth of the other stator iron core portion, the angle $\theta_0$ being selected so as to satisfy a relation of $0<\theta_0<90/Nr$ degrees.

4. A permanent magnetic type rotor of a hybrid type stepping motor, comprising: at least two rotor units combined through a single rotary shaft, each of said rotor units having a structure in which a permanent magnet is sandwiched between two rotor yokes each of which is made of magnetic material and provided with a plurality of pole teeth formed at equal pitches on its outer circumference, said two rotor yokes of each of said rotor units being arranged so as to be shifted in angular position from each other by a half of the pitch of arrangement of said pole teeth of each of said rotor yokes, characterized in that said at least two rotor units are arranged so that the pole teeth of said two rotor yokes of one of said at least two rotor units are shifted in angular position from the corresponding pole teeth of said two rotor yokes of the other one of said at least two rotor units by an angle smaller than a quarter of the pitch of arrangement of said pole teeth.

5. A permanent magnetic type rotor of a hybrid type stepping motor, comprising: at least two rotor units combined through a single rotary shaft, each of said rotor units comprising a cylindrical permanent magnet which is provided with a plurality of alternately magnetized north and south poles at equal pitches on an outer circumference of said permanent magnet, characterized in that said at least two rotor units are arranged so as be shifted in angular position from each other by an angle smaller than a half of the pitch of arrangement of said north and south poles adjacent to each other.

* * * * *